US006270935B2

(12) United States Patent
Tatsumi et al.

(10) Patent No.: US 6,270,935 B2
(45) Date of Patent: Aug. 7, 2001

(54) INDEX PHOTOGRAPH, EXPOSED FILM PACKAGE, AND FILM PACKAGE PRODUCING SYSTEM

(75) Inventors: Setsuji Tatsumi, Kanagawa; Kazuhiro Tagawa, Tokyo; Toru Kurokawa, Tokyo; Katsumi Otake, Tokyo; Masashi Horiguchi; Toru Tsuji, both of Kanagawa, all of (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/759,135

(22) Filed: Jan. 16, 2001

Related U.S. Application Data

(62) Division of application No. 08/362,902, filed on Dec. 23, 1994.

(30) Foreign Application Priority Data

Dec. 24, 1993 (JP) ...................................... 5-328823

(51) Int. Cl.⁷ ............................ G03C 11/00; B65D 85/48; B65B 63/00; A21C 15/04
(52) U.S. Cl. ............................. 430/22; 53/435; 206/455; 281/31; 402/79; 430/11; 430/952
(58) Field of Search .................................. 430/9, 10, 22, 430/952, 11; 206/455; 281/31; 462/79; 53/435

(56) References Cited

U.S. PATENT DOCUMENTS

| | | | |
|---|---|---|---|
| 4,805,039 | 2/1989 | Otake et al. | 358/355 |
| 4,966,285 | 10/1990 | Otake et al. | 206/455 |
| 5,031,773 | 7/1991 | Manico et al. | 206/455 |
| 5,314,066 | 5/1994 | Gresh | 206/455 |
| 5,431,449 | 7/1995 | Arimoto et al. | 206/455 |
| 5,436,694 | 7/1995 | Ishikawa et al. | 206/455 |

FOREIGN PATENT DOCUMENTS

| | | |
|---|---|---|
| 0301397 | 2/1989 | (EP) . |
| 0308967 | 3/1989 | (EP) . |
| 0614118 | 9/1994 | (EP) . |

*Primary Examiner*—Richard L. Schilling
(74) *Attorney, Agent, or Firm*—Sughrue, Mion, Zinn, Macpeak & Seas, PLLC

(57) ABSTRACT

An exposed film package for preserving one strip of exposed photographic film includes a film sheath, which has plural pockets. Plural film pieces are formed by cutting the one strip of the exposed film, and contained respectively in the pockets in the film sheath. An index photograph is constituted of photographic paper, on which positive images of frames from the one strip of the exposed film are printed. The photographic paper has a size substantially equal to the film pieces. The positive images are formed in reducing a size of the frames, and grouped in association with the film pieces. Groups of the positive images are arranged in consideration of an order of exposure of the frames. The index photograph is contained in one of the pockets in association with the film pieces constituting the one strip.

2 Claims, 13 Drawing Sheets

FIG. 11

INDEX PHOTOGRAPH, EXPOSED FILM PACKAGE, AND FILM PACKAGE PRODUCING SYSTEM

This is a Rule 53(b) Divisional of Application Ser. No. 08/362,902 filed Dec. 23, 1994, the disclosure of which is incorporated herein by reference.

BACKGROUND OF THE INVENTION

1. Field of the Invention

The present invention relates to an index photograph, an exposed film package, and a film package producing system. More particularly, the present invention relates to an index photograph which can be combined with an exposed film package containing an exposed film, and to a film package producing system.

2. Description Related to the Prior Art

A known index photograph is disclosed in U.S. Pat. Nos. 4,805,039 and 4,966,285. Frames on an exposed negative film are arranged in a matrix, and printed on photographic paper in a reduced size to obtain the index photograph, which is useful for easy recognition of all the frames on the negative film. To produce an index photograph, a plurality of film pieces are arranged. The negative film is cut into the film pieces to be contained in the film sheath. The film pieces are then arranged on a stage in the same manner as contained in the film sheath. The film pieces on the stage are retained by a mask plate. The rear of the film pieces is illuminated, so as to print reduced images on photographic paper through a printing lens for reduction in size.

The index photograph has an aspect ratio equal to a contour of the film sheath. The film sheath should be preserved with the index photograph, but might be separated inadvertently from the film sheath, and be lost, as the index photograph has a size that is not convenient for containing and preservation.

SUMMARY OF THE INVENTION

In view of the foregoing problems, an object of the present invention is to provide an index photograph which is prevented from being lost even after long preservation with exposed negative film, and an exposed film package, and a film package producing system.

In order to achieve the above and other objects and advantages of this invention, an index sheet, constituted of image-recording material on which positive images of frames from one strip of exposed photographic film are recorded is provided. The strip of the exposed film is cut into plural film pieces. The image-recording material has a size substantially equal to the film pieces. The positive images are formed in reducing a size of the frames, and grouped in association with the film pieces. Groups of the positive images are arranged in consideration of an order of exposure of the frames.

In an exposed film package for preserving one strip of exposed photographic film, a film sheath has plural pocket portions open along a lengthwise edge of the film sheath. Plural film pieces are formed by cutting the one strip of the exposed film, and the pieces are contained respectively in the pocket portions in the film sheath. An index sheet are constituted of an image-recording material on which positive images of frames from the one strip of the exposed film are recorded. The image-recording material has a size substantially equal to the film pieces. The positive images are formed while reducing a size of the frames, and grouped in association with the film pieces. Groups of the positive images are arranged in consideration of an order of exposure of the frames. The index sheet is contained in one of the pocket portions in association with the film pieces constituting the one strip.

To produce an exposed film package, respective exposed photographic film is cut into film pieces at a predetermined length, to insert the film pieces into pocket portions in a film sheath material. The film pieces is so inserted that one of the pocket portions remains empty beside pocket portions associated with film pieces having been inserted in the film sheath material. The film sheath material is wound as a roll after insertion of the film pieces. The film sheath material is unwound from the roll, to insert an index sheet into the empty pocket portion in association with the exposed film. The index sheet is constituted of photosensitive material on which images from the exposed film are recorded in reduction in size, and arranged in groups associated with the film pieces, the photosensitive material having a size substantially equal to the film pieces. A film sheath is cut from the film sheath material after insertion of the index sheet, to obtain the exposed film package. The exposed film package includes the film pieces constituting the exposed film, the index sheet, and the film sheath containing the film pieces and the index sheet.

In a system of producing the exposed film package, a film cutting inserter section cuts the exposed film into the film pieces, and inserts the film pieces into the pocket portions in the film sheath. An index sheet stacker device stacks index sheets in an order of exposed films associated with the index sheets, each of the index sheets constituted of image-recording material on which positive images of frames from the strip of the exposed film are recorded in reduction in size, the image-recording material having a size substantially equal to the film pieces. A sheet inserter section receives the index sheets from the stacker device and inserts the index sheets into the pocket portions, each of the index sheets contained in the exposed film package in association with the film pieces constituting the one strip.

Further, a pick-up device picks up the frames of the exposed film, to generate a frame signal. A printer device is connected to the pick-up device, and prints the index sheet. In the printer device, an image treating section produces a combined image in which positive images of the frame from the exposed frames of the strip are arranged in groups associated with the film pieces. The combined image is produced at a reduction in size. An image recorder section records on the image-recording material in accordance with a signal of the combined image to produce the index sheet.

In the present invention, the index photograph can be prevented from being lost after preservation with the exposed negative film. The size of the index photograph is compatible with the film sheath. At the time of extra printing, the index photograph can be utilized to recognize easily each of the frames.

BRIEF DESCRIPTION OF THE DRAWINGS

The above objects and advantages of the present invention will become more apparent from the following detailed description when read in connection with the accompanying drawings, in which:

FIG. 11 is a plan view illustrating an index photograph for a 36-exposure film;

DETAILED DESCRIPTION OF THE PREFERRED EMBODIMENT(S) OF THE PRESENT INVENTION

Figure 1:
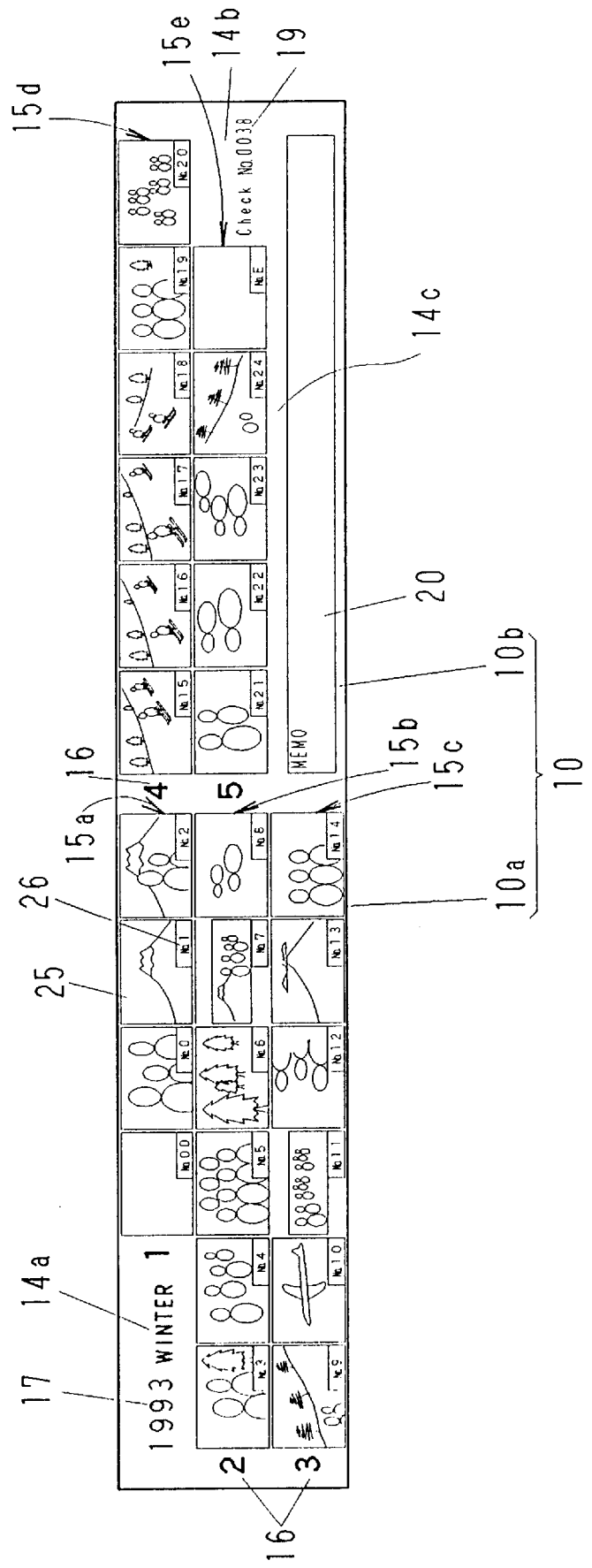
FIG. 1 is a plan view illustrating an index photograph of the present invention.
Figure 2:
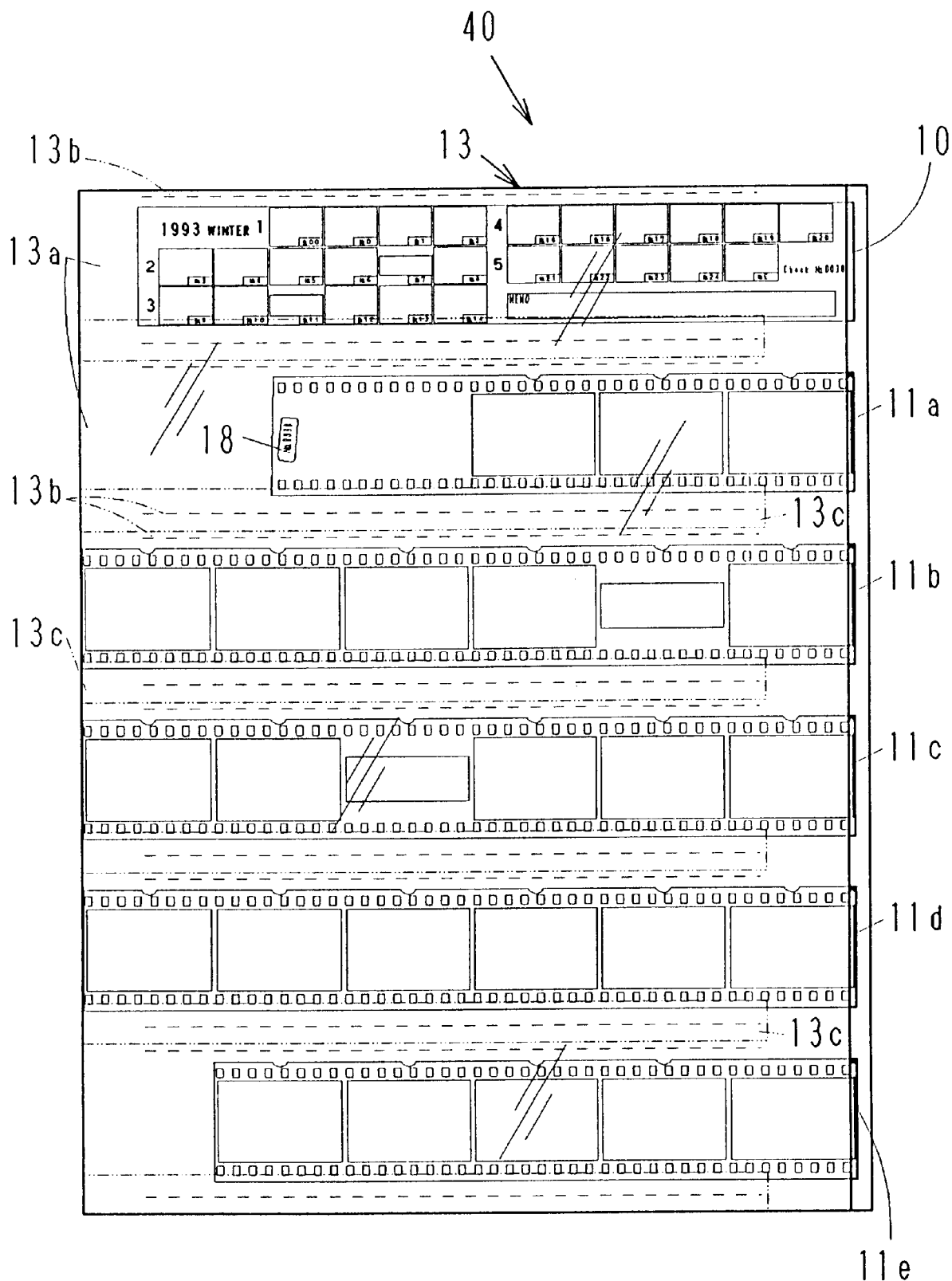
FIG. 2 is a plan view illustrating an exposed film package with the index photograph.

FIG. 1 illustrates an index photograph 10 produced for a 135 film of 24 exposures, which is cut into five film pieces 11a to 11e as illustrated in FIG. 2. As is known in the art, the 135 film standardized for 24 exposures can be used for taking at most 27 exposures at the positions of frame numbers "00, 0, 1, 2, . . . , 24, E", where 00 and 0 are located on a film leader, and E is located on a film trailer. An example of a commercially available product capable of taking 27 exposures in photography, is a lens-fitted film unit having a trade name "Fujicolor Quick Snap +3" sold by the assignee of the present invention. In a similar manner, it is possible on 12-exposure or 36-exposure film to take at most 15 or 39 exposures inclusive of three additional exposures.

Each film piece is formed by cutting the filmstrip at the length of six frames, as is known in the art. As the 135 film for the 24 exposures can be provided with three frames additional to 24 frames, the single strip of negative film is cut into at least the five film pieces 11a to 11e as illustrated in FIG. 2. In view of the 27 exposures at most, the first film piece 11a and the fifth film piece 11e have fewer frames than the second to fourth film pieces 11b to 11d, and have smaller lengths. In the embodiment, the first film piece 11a has four frames of Nos. 00, 0, 1 and 2. The second film piece 11b has six frames of Nos. 3 to 8. The third film piece 11c has six frames of Nos. 9 to 14. The fourth film piece 11d has six frames of Nos. 15 to 20. The fifth film piece 11e has five frames of Nos. 21 to 24 and E. Even if a negative film has no frames recorded at Nos. 00 and 0 close to the leader, the negative film is cut between Nos. 2 and 3 to form the first film piece 11a similarly.

Figure 3:
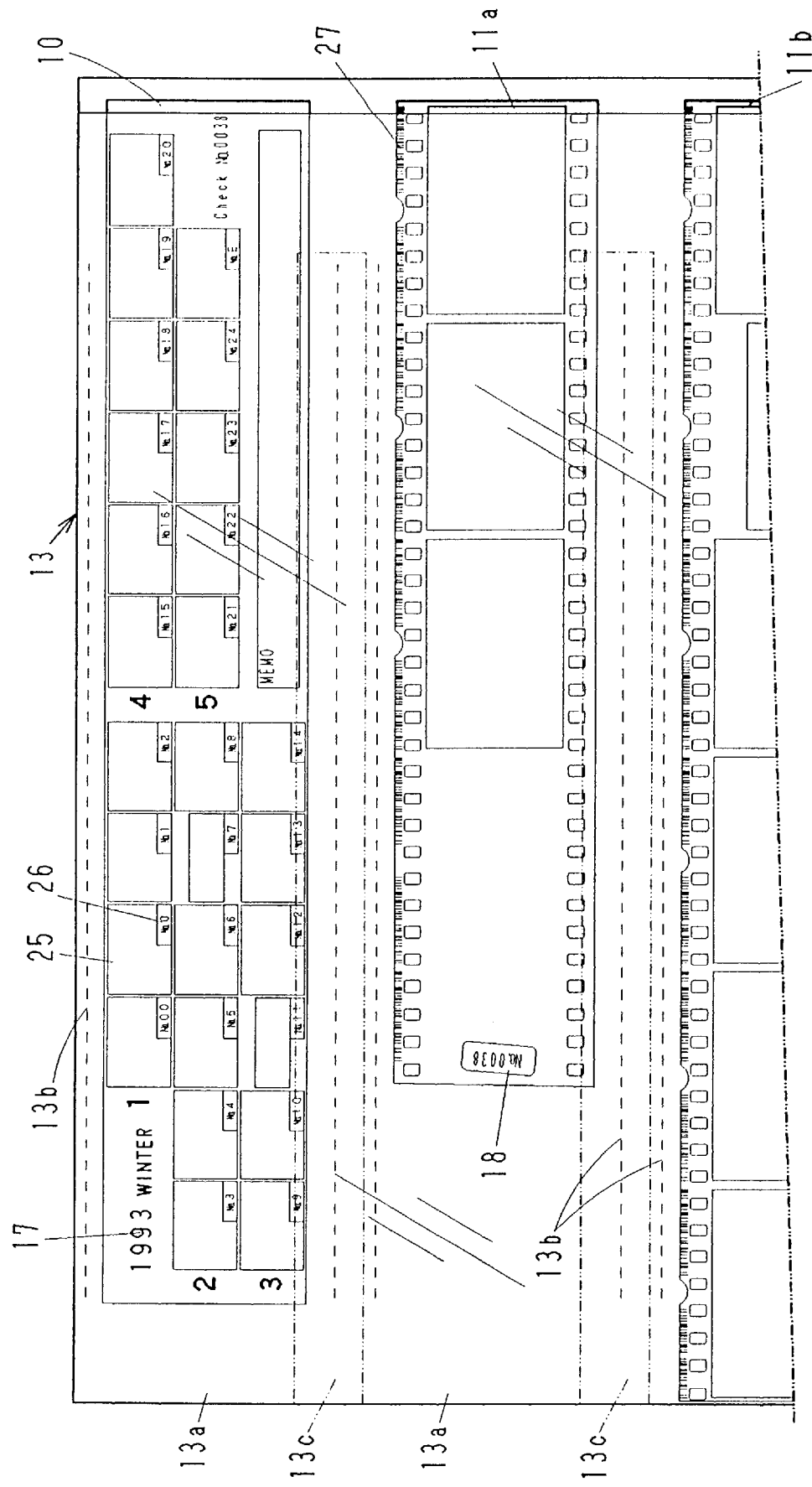
FIG. 3 is a plan view illustrating part of the exposed film package in enlargement.

In the present embodiment, negative film, illustrated in FIGS. 1 to 3, has been exposed in a camera of which a frame size is changeable between a panoramic size and a full size. Frames with Nos. 7 and 11 are exposed at the panoramic size, and are also recorded on the index photograph 10, on which the panoramic size of Nos. 7 and 11 can be apparently recognized. The frames on the index photograph 10 have a proportionally reduced size. If other negative films have only full size frames, half size frames, and wide-vision (WV) size frames (at an aspect ratio equal to that of the High-Definition Television), the formats on the films are similarly reduced on the index photograph.

The index photograph 10 is formed to have a size equal to, or slightly smaller than, each of the film pieces 11b to 11d having six frames. The index photograph 10 is insertable into pockets 13a formed in a film sheath 13 which is known in the art. The film sheath 13 is constituted of continuous resinous film with transparent or translucent characteristic. The resinous film is folded in two, and welded together along welding lines 13b, e.g. a train of perforations, to define a great number of the pockets 13a arranged consecutively. A blank belt portion 13c is formed along a bottom of each pocket 13a, and used for manually writing the number of prints to be ordered in extra printing.

In FIG. 1, the index photograph 10 has two half areas 10a and 10b arranged in its longitudinal direction. In the first half area 10a, film piece images 15a, 15b and 15c of the first to third film pieces 11a, 11b and 11c are recorded in three lines in positive fashion. In the second half area 10b, film piece images 15d and 15e of the fourth and fifth film pieces 11d and 11e are recorded in two lines in positive fashion. There are film piece numbers 16 recorded close to the film piece images 15a to 15e of the film pieces 11a to 11e.

The first and fifth film pieces 11a and 11e have fewer frames and the smaller lengths, which cause the index photograph 10 to have two imageless portions 14a and 14b. As the second half area 10b has the film piece images 15d and 15e of only the two film pieces 11d and 11e, an imageless portion 14c is defined under the film piece image 15e of the fifth film piece 11e to be as great as the film piece image 15e.

In the imageless portion 14a next to the film piece image 15a of the film piece 11a, a caption 17 is recorded, for example, time information such as "1993 WINTER", "1993 SUMMER" and "November 1993", or title "ATHLETIC MEET" and "BIRTHDAY PARTY". The caption 17 can be added by a photofinisher as desired by a customer on photographer when a photofinishing order is accepted. It is alternatively possible to add automatically the caption 17 of only the date or season of acceptance of the photofinishing order. A negative film may be exposed in a camera which is capable of automatically writing information regarding photography to the negative film. If there is caption information included in the photographic information as recorded, the photofinisher can add the caption 17 to the index photograph according to the caption information.

In the imageless portion 14b next to the fifth film piece image 15e, a check number 19, such as "Check No. 0038", is recorded to represent the number of a check tape 18 (See FIG. 3) attached to the negative film in the course of the photofinishing operation. It is possible through the check number 19 to associate the negative film with the index photograph 10 without discerning the images visually.

A blank space 20 is formed in the imageless portion 14c under the film piece image 15e of the film piece 11e, by printing the blank space 20 to be white. The blank space 20 is used for the user to write object information or the date of photography. Instead of the white blank space 20 it is possible to record a film manufacturer name or a title "INDEX SHEET". It is further possible to record various kinds of information: a photo laboratory code in a form of number, exposure correcting data, and photographic information which is written by a camera to a magnetic recording layer or photochemical data recording areas of the negative film.

In each positive image 25 of the frames on the film pieces 11a to 11e, a frame number 26 is recorded. The frame number 26, although depicted in dark color in FIG. 1, is blank or white, in the a portion fully colored black in planar fashion. The frame number 26 is determined by use of a bar code reader, which reads a frame number bar code 27 formed along an edge of the negative film, as shown in FIG. 3. If there is no image at No. 00 or E as illustrated in FIG. 1, a blank is formed for its associated positive image 25, and visually indicates lack of exposure.

Figure 4:
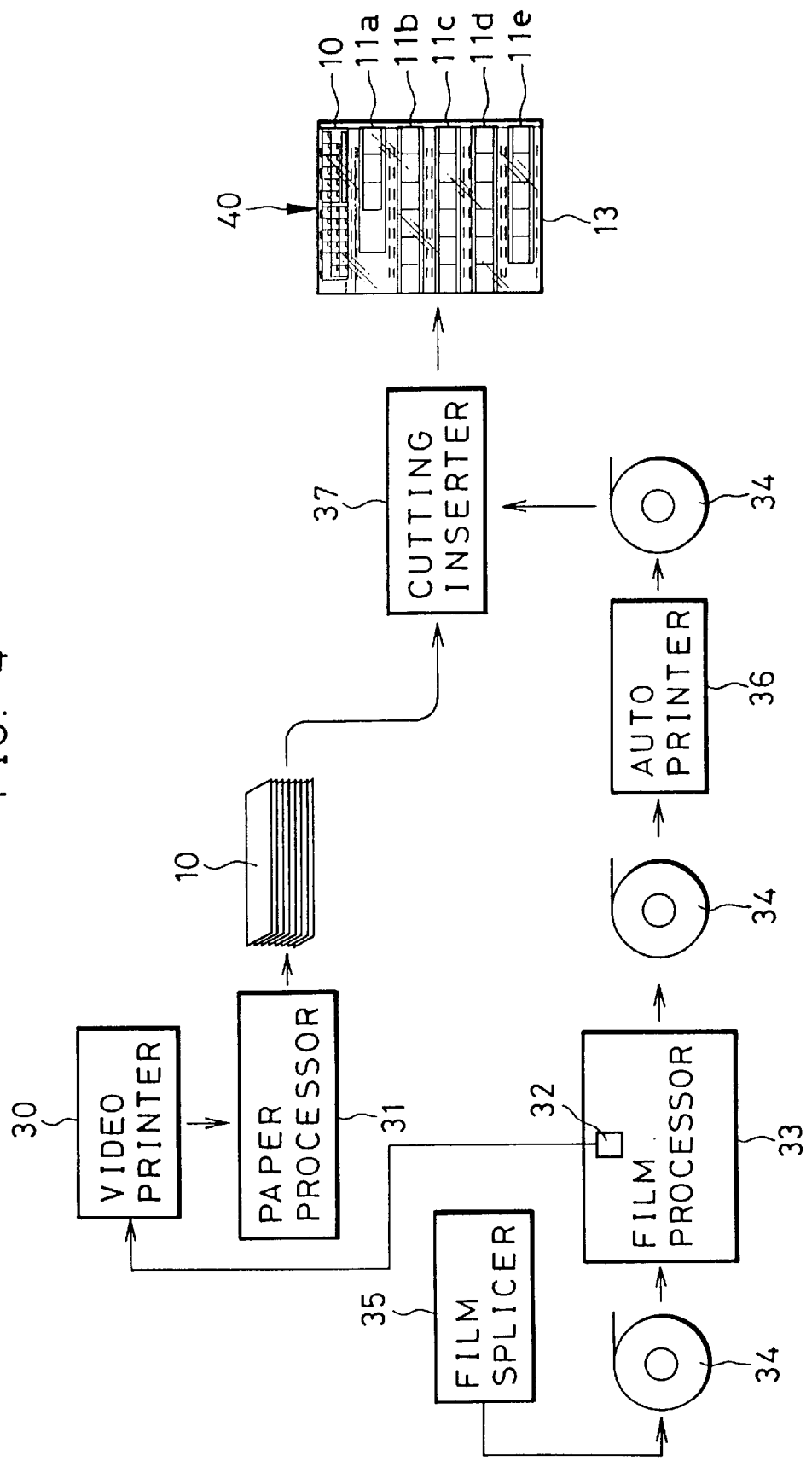
FIG. 4 is a schematic view illustrating a system of producing the exposed film package.

The index photograph 10 is produced at a size that is equal to each film piece by a video printer 30 and a paper processor 31, as illustrated in FIG. 4. A scanner 32 is connected to the video printer 30. The scanner 32 is incorporated in a film processor 33 and disposed at its outlet for a negative film 34. The scanner 32 picks up each frame of the elongated negative film 34 as developed by the film processor 33, and sends a frame signal to the video printer 30. The elongated negative film 34 is formed by splicing a number of strips of negative films at a film splicer 35 well-known in the art. The elongated negative film 34 after development is inspected at each frame in passage through a notcher/puncher (not shown), and set in an auto printer 36, which exposes color photographic paper to record images to be printed. The elongated negative film 34 after the printing is cut by a film cutting inserter 37 at a predetermined length, to obtain the film pieces 11a to 11e as illustrated in FIG. 2, which are inserted into the film sheath 13. Also, the index photograph 10 is inserted into the pocket 13a. Accordingly an exposed film package 40 with the index photograph is obtained. The color paper printed in the auto printer 36 is treated in a paper processor (not shown) for development, cut by a paper cutter at each frame, and classified regarding each of the filmstrips associated with the frames.

Figure 5:
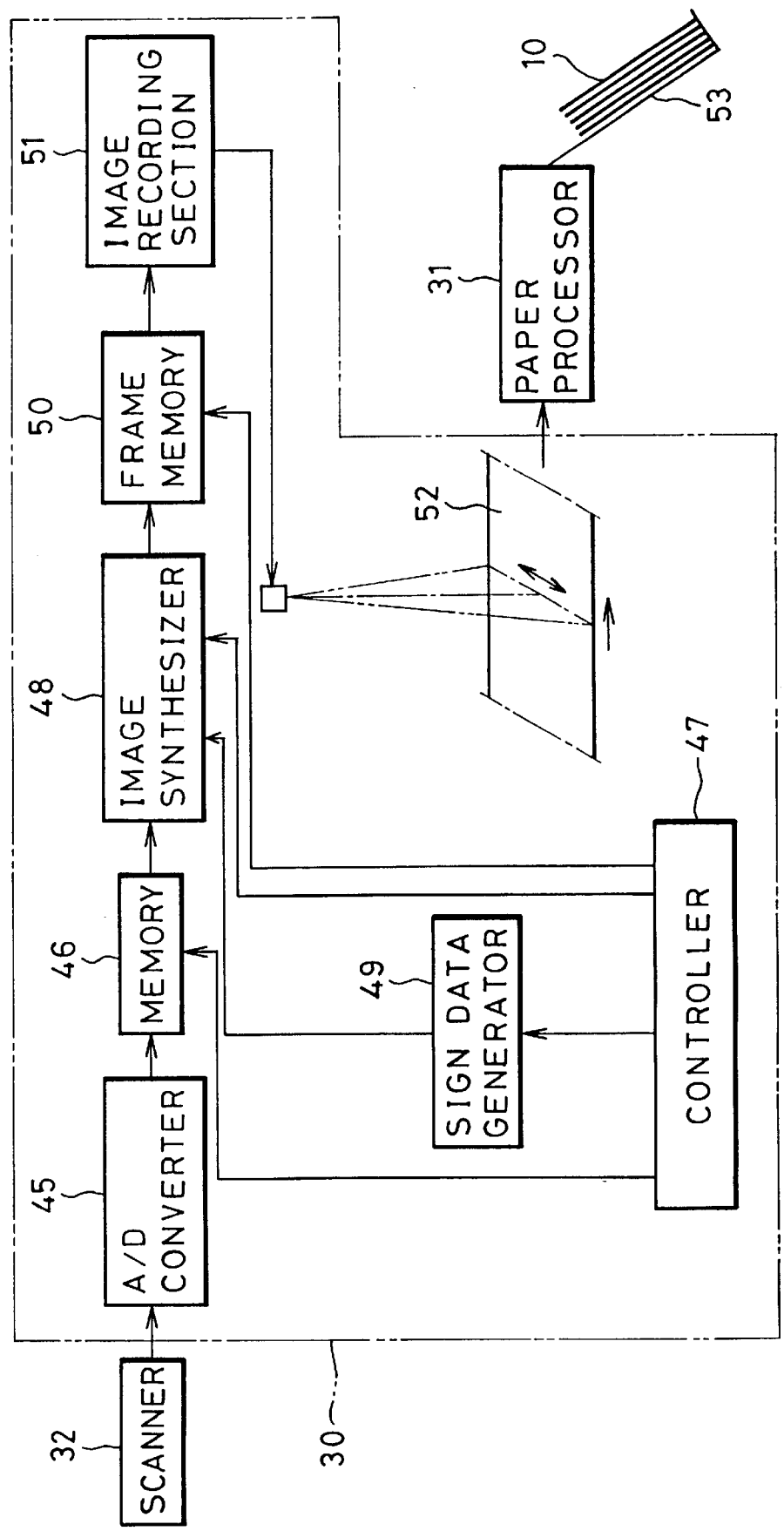
FIG. 5 is a block diagram schematically illustrating a video printer.

In the video printer 30, the frame signal read by the scanner 32 is digitalized by an A/D converter 45, and written in a memory 46 color by color, as illustrated in FIG. 5. A controller 47 controls an image synthesizer 48, which reads a frame signal out of the memory 46 in thinned form, and synthesizes the thinned frame signal of each frame, the film piece number 16, the caption 17, the check number 19 and the note blank 20 in a predetermined area while utilizing a preset format as illustrated in FIG. 1. To the image synthesizer 48, a sign data generator 49 is connected. The sign data generator 49 generates sign data inclusive of the film piece number 16, the caption 17, the check number 19 and the note blank 20, and sends the sign data to the image synthesizer 48. A combined image generated from the image synthesizer 48 is written to a frame memory 50 associated with each of the three colors. An image recorder section 51 exposes color paper 52 according to a laser beam system to print the combined image from the frame memory 50. The color paper 52 as exposed is processed by the paper processor 31, cut for each strip of negative film and at the size equal to the film pieces, and exited to a receptacle tray 53. Note that an image treating section of the video printer 30 is constituted of the A/D converter 45, the memory 46, the controller 47, the image synthesizer 48, the sign data generator 49, and the frame memory 50.

Figure 6:
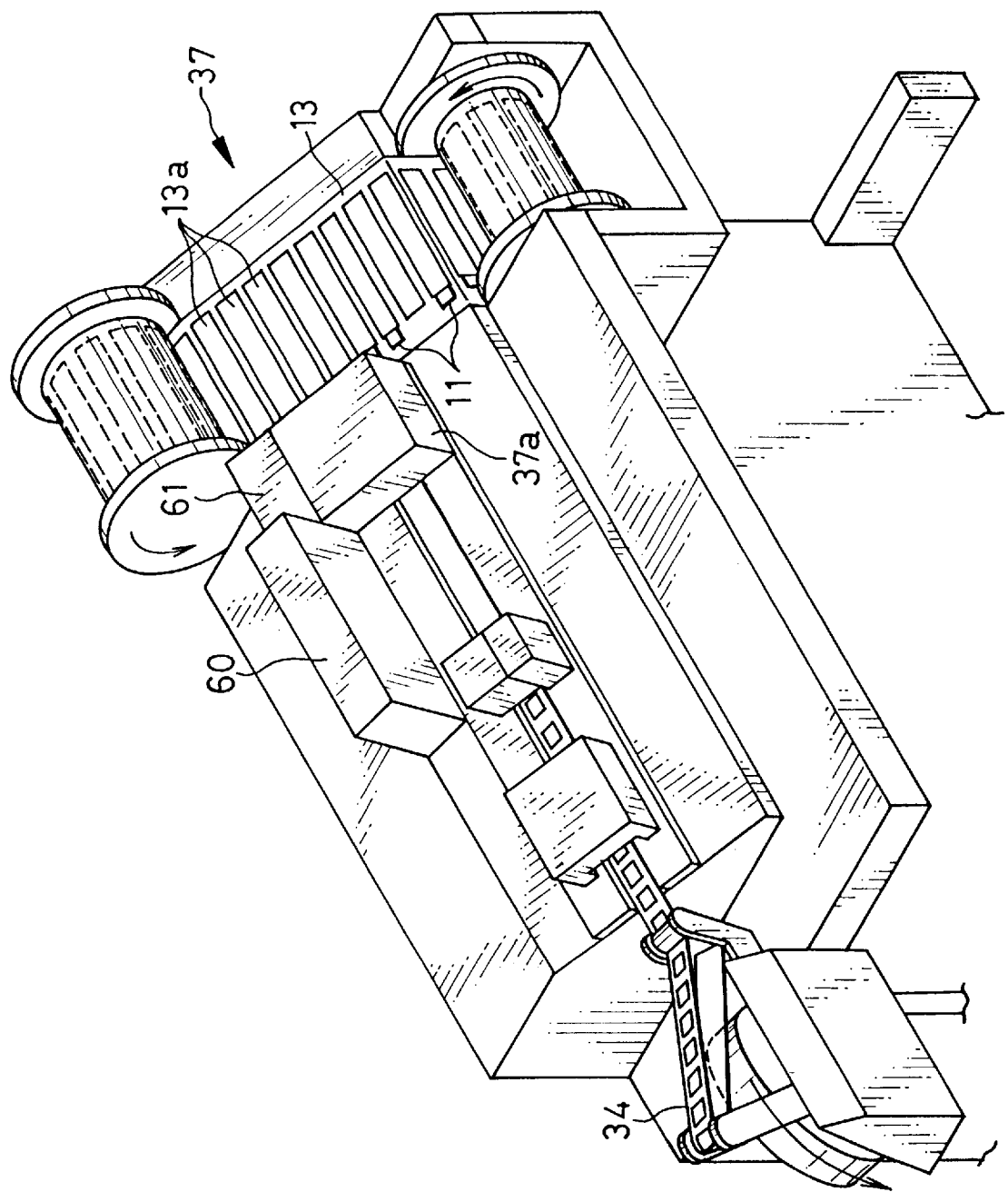
FIG. 6 is a perspective view generally illustrating a film cutting inserter.

The index photograph 10 for each filmstrip is set in an index photograph stacker 60 in the cutting inserter 37, as illustrated in FIG. 6. The cutting inserter 37 has a cutting inserter section 37a which is known in the art and to which the index photograph stacker 60 and an index photograph inserter section 61 are added. In the embodiment, the index photograph inserter section 61 is disposed upstream of a station for inserting the film pieces 11a to 11e. The index photograph 10 is inserted into the pocket 13a prior to the insertion of the film pieces 11a to 11e.

Figure 7:
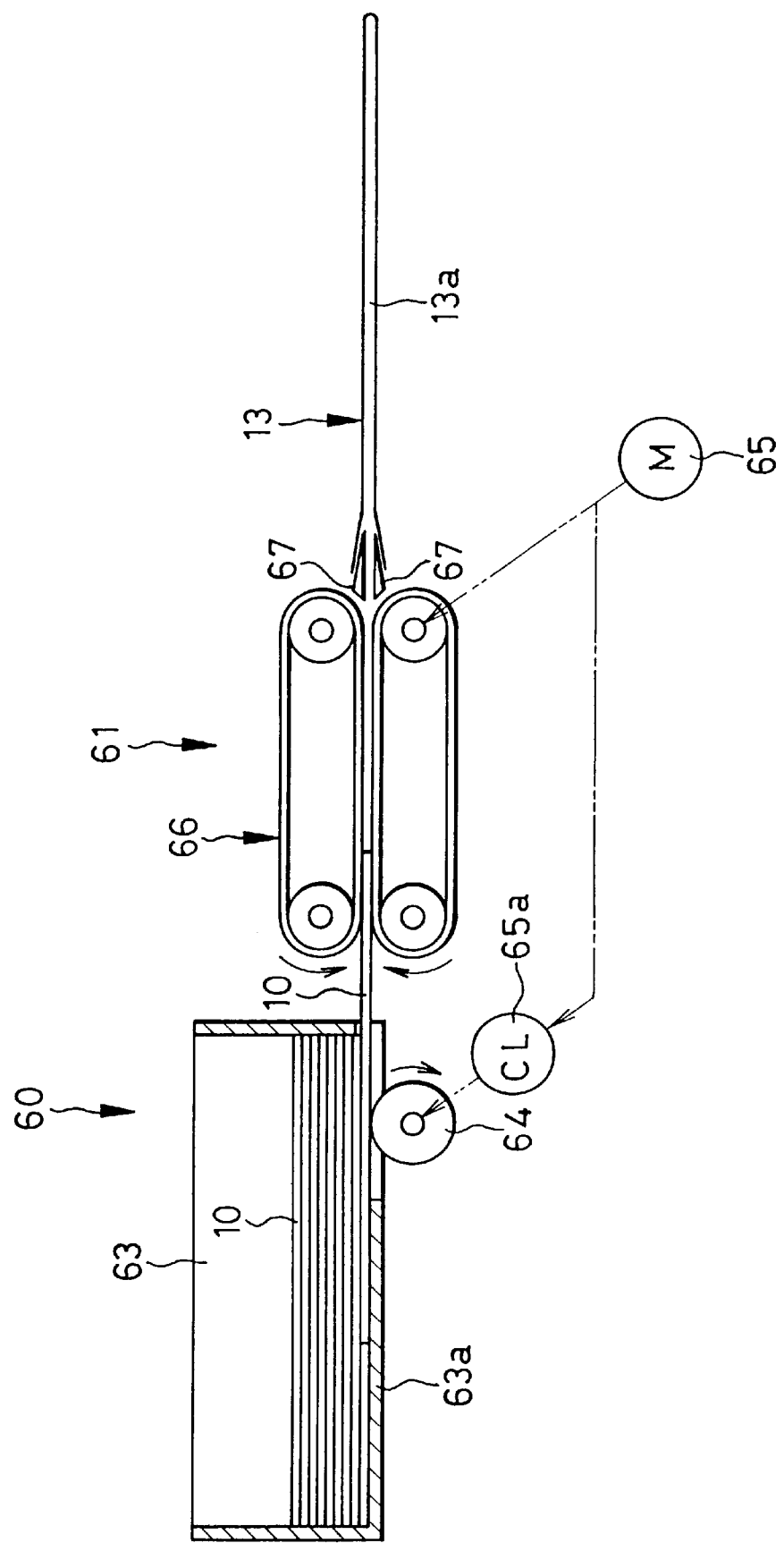
FIG. 7 is a schematic view illustrating an index photograph stacker and an index photograph inserter section.

As illustrated in FIG. 7, the index photograph stacker 60 consists of a case 63 which contains a number of index photographs 10 stacked from the bottom to the top in the order of the strips of the associated negative films. An advancing roller 64 is disposed to confront a bottom opening 63a in the case 63. The advancing roller 64 pulls a lowest one of the index photographs 10 and advances it toward the index photograph inserter section 61. The index photograph inserter section 61 includes a pair of nip belts 66 and a guide plates 67. The nip belts 66 nip the index photograph 10 as advanced, rotate, and insert it into the pocket 13a in the film sheath 13. The advancing roller 64 and the nip belts 66 are rotated in synchronism by a motor 65. An electromagnetic clutch 65a is associated with the advancing roller 64. After the index photograph 10 is nipped by the nip belts 66, the advancing roller 64 is released to be free by the clutch 65a. Accordingly a second lowest one of the index photographs 10 is prevented from being advanced even in contact with the advancing roller 64.

Figure 8:
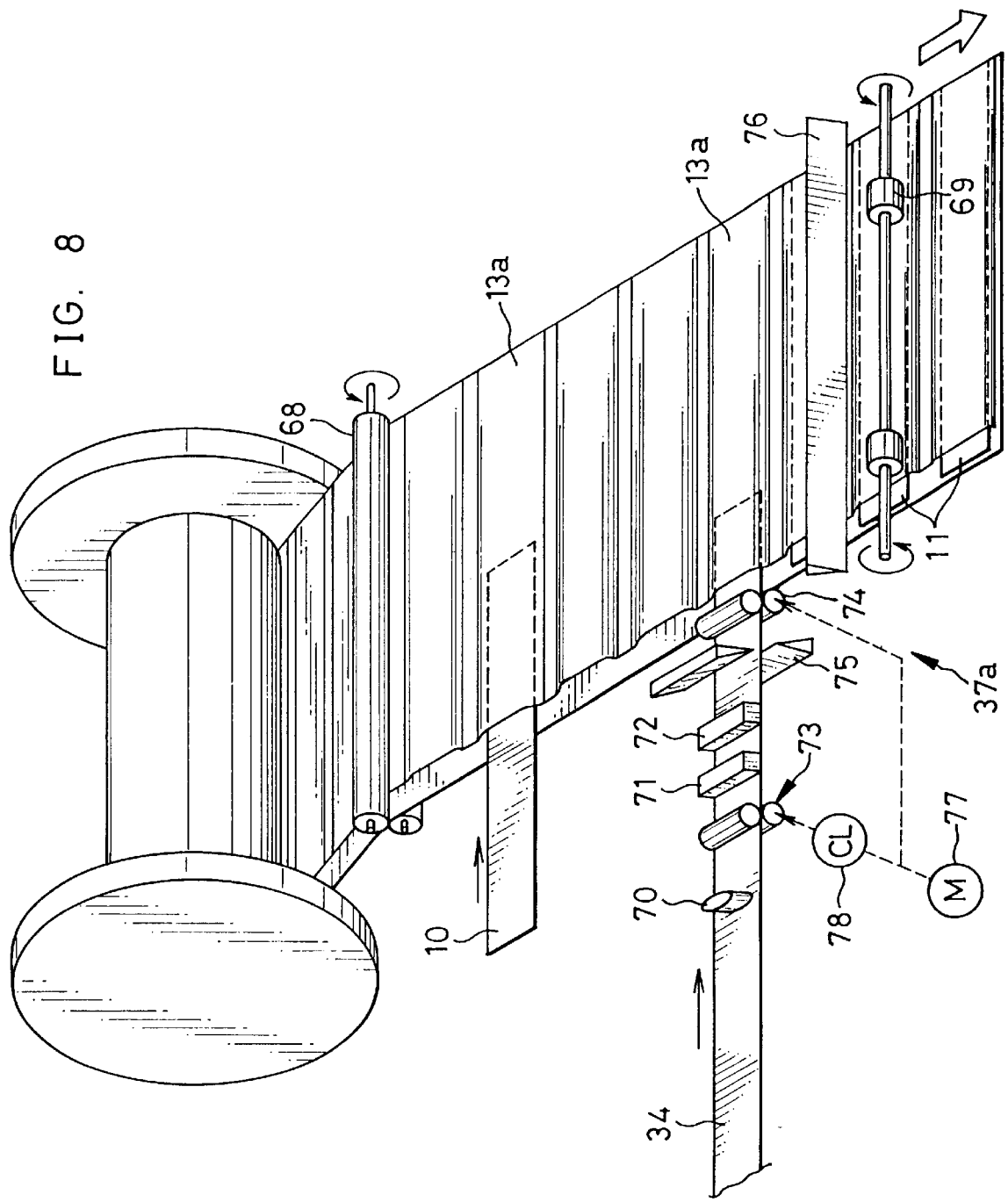
FIG. 8 is a perspective view illustrating part of the film cutting inserter.
Figure 9:
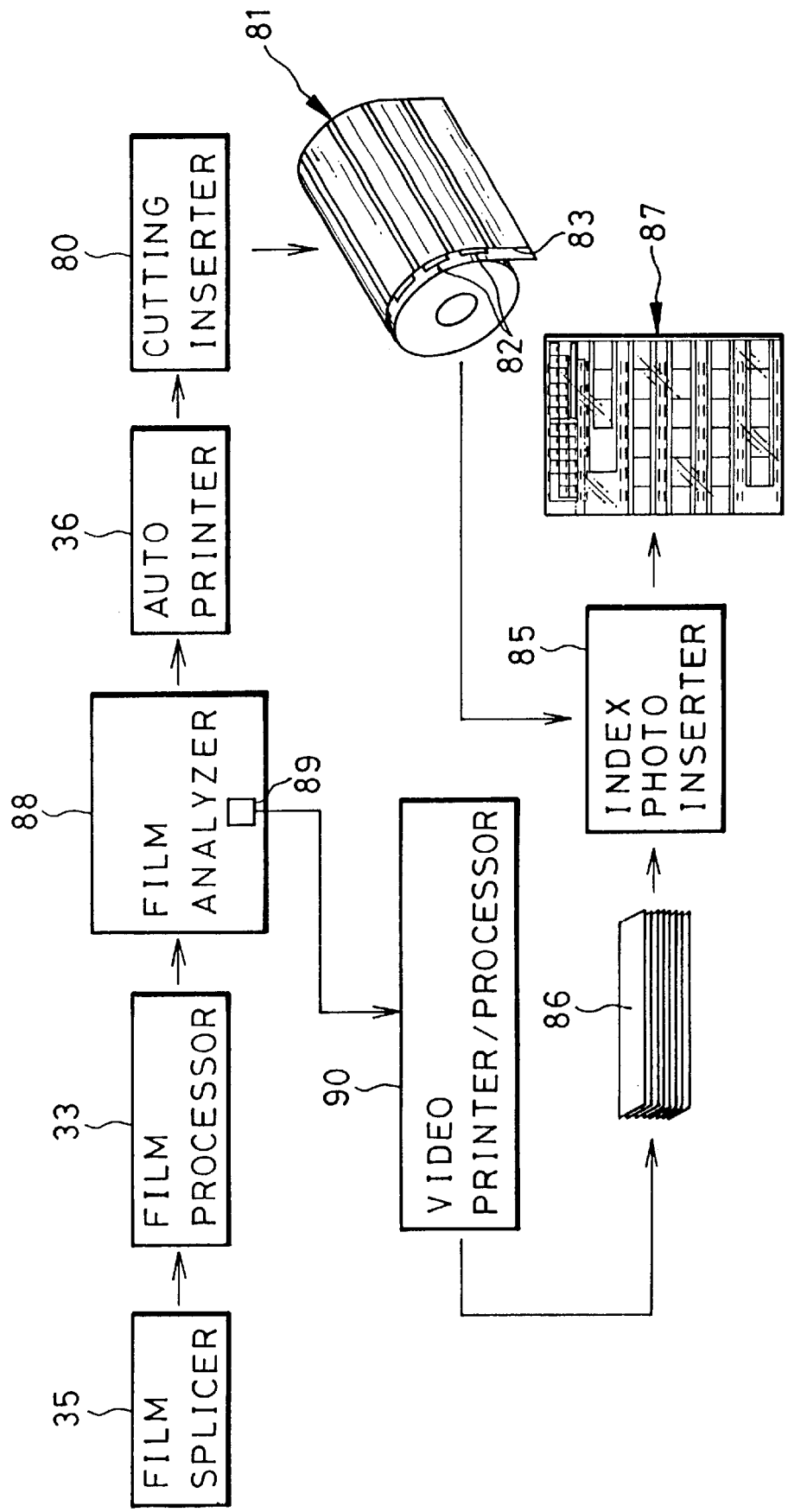
FIG. 9 is a schematic view illustrating another system of producing the exposed film package.

As illustrated in FIG. 8, the cutting inserter section 37a includes a splice sensor 70, an edge sensor 71, and a bar code reader 72 for frame numbers. The sensor 70 and 71 and the reader 72 generate detecting signals, which are used to detect a position of splicing filmstrips, an edge position of each of the frames, and a frame number bar code. Two pairs of film transport rollers 73 and 74 and a cutter 75 are controlled to cut the film piece 11 from the elongated negative film 34 to be included in each filmstrip. The film piece 11 has a format the same as appears on the index photograph 10. When the single film piece 11 is cut off and inserted in the pocket 13a, then the pairs of the sheath transport rollers 68 and 69 transport the film sheath 13 as far as one pocket 13a. Similarly, next film piece is cut off and inserted into the pocket 13a. A third last one of the film pieces constituting the filmstrip is cut and inserted. At the same time, the index photograph inserter section 61 inserts the index photograph 10 into the pocket 13a. After last film piece is inserted, the film sheath 13 is transported as far as two pockets in intermittent fashion. The film pieces 11 of next filmstrip are cut off from the elongated negative film 34, and are inserted into the pocket 13a. The film transport rollers 73 and 74 are rotated in synchronism by a motor 77. The upstream pair of the rollers 73 are associated with an electromagnetic clutch 78, which enables only the downstream pair of the rollers 74 to rotate after cutting of each film piece 11 to be inserted in the pocket 13a.

The set of film pieces 11 is adjacent to another index photograph produced from negative film of a strip different from that constituted by the set of film pieces 11, so that there is a border line positioned between the different strips. The border line is provided with a cutting line as a train of perforations by a perforator 76. This makes it easy to cut the film sheath along the cutting line and to separate exposed film packages strip by strip. Note that it is possible to dispose a sheet cutter instead of the perforator 76. The film sheath can be cut off by a film cutting inserter without being wound in a form of roll.

In the above, there is an interval as much as two pockets 13a between the cutting inserter section 37a and the index photograph inserter section 61. However it is possible to arrange the cutting inserter section 37a and the index photograph inserter section 61 at an interval corresponding to two adjacent pockets 13a.

In the above embodiment, the negative film is cut every six frames and according to a predetermined format, i.e. in positions between Nos. 2 and 3, between Nos. 8 and 9, between Nos. 14 and 15, and between Nos. 20 and 21, except for the leader and the trailer. Alternatively the positions for cutting can be differently determined as desired. It is possible for a film cutting inserter to generate cutting position information in cutting of the negative film, and for a video printer to produce an index photograph by operating according to cutting position information as generated. Further, it is possible for a film cutting inserter to have a cutting algorithm, and for a video printer to predetermine cutting positions for film pieces according to the algorithm, to synthesize positive images of the film pieces.

In the above, the index photograph is inserted into the pocket before the insertion of the film pieces. It is also possible that the film pieces are inserted before the insertion of the index photograph. The film pieces are inserted, while reserving one empty pocket between a final film piece from a first filmstrip and a first film piece from a second filmstrip. The reserved pocket is used for receiving the index photograph.

In the above embodiment, the index photograph 10 is inserted by the cutting inserter 37 into the pocket. In contrast, a film sheath 81 can be wound as a roll after a film cutting inserter 80 has inserted film pieces and before an index photograph inserter 85 of a separate type inserts an index photograph 86 int o the film sheath 81 while unwound from the roll. Reference numeral 83 designates a single pocket, which remains empty after the insertion of the film pieces and which receives the index photograph 86, to obtain an exposed film package with the index photograph. In the embodiment, a scanner 89 generates a frame signal of each frame during inspection of the frame in a film analyzer 88. In accordance with the frame signal a video printer/processor 90 produces the index photograph 86. Elements similar to those of the above embodiment are designated with identical reference numerals. Although the scanner 89 is associated with the film analyzer 88, it is possible to incorporate a scanner in the film processor 33 to pick up the frames. Further, the index photograph inserter 85 can be integrated with, and located downstream of, the video printer/processor 90. Operation of this integrated index photograph inserter 95 is the same as the former separate one.

It is alternatively possible for an index photograph inserter to insert the index photograph before winding the film sheath as a roll, while reserving plural empty pockets as many as the film pieces to be inserted. Then the roll sheath is unwound, before the reserved pockets can be used for receiving the film pieces.

In the above, the negative filmstrip has the length standardized for 24 exposures. Alternatively negative films for 12 or 36 exposures may be used. It is possible on the filmstrip to take at most 15 or 39 exposures. The film-strip for 12 exposures is cut into three film pieces. The filmstrip for 36 exposures is cut into seven film pieces.

Figure 10:
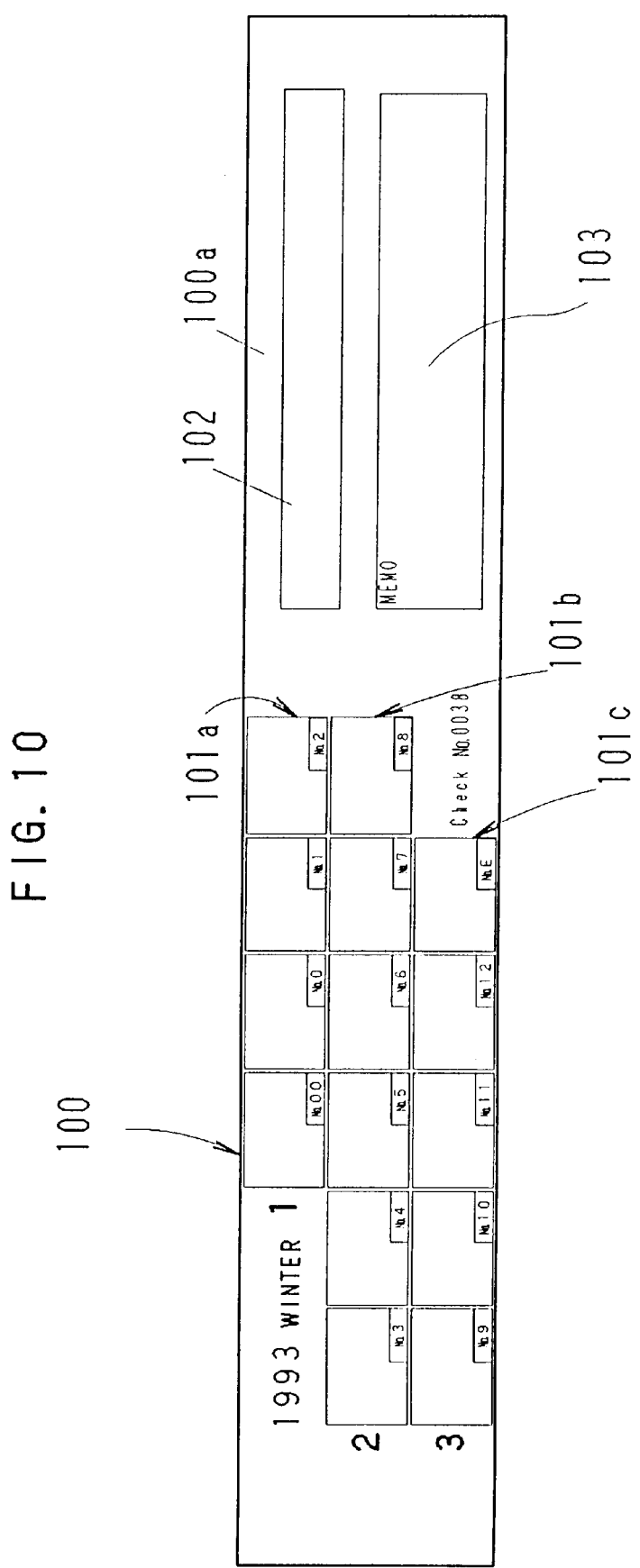
FIG. 10 is a plan view illustrating an index photograph for a 12-exposure film.

As illustrated in FIG. 10, an index photograph 100 for the 12-exposure film is provided with three film piece images 101a to 101c in positive fashion. There appears an imageless portion 100a which is three times as large as each of the film piece images 101a to 101c. Spaces 102 and 103 are formed in the imageless portion 100a. The space 102 is used for printing data regarding photography and/or correction of exposure. The space 103 is blank and used for writing notes manually. In spite of this, it is possible to record the positive images in greater sizes than those of the former index photograph 10 for the 24 exposures and without forming the imageless portion 10a. It is likely that the frames cannot be juxtaposed in the same manner as the film pieces. However frame numbers can be recorded in association with positive images. Gaps as blanks can be formed between film piece images to specify the frames at which different film piece images are juxtaposed.

Figure 11:
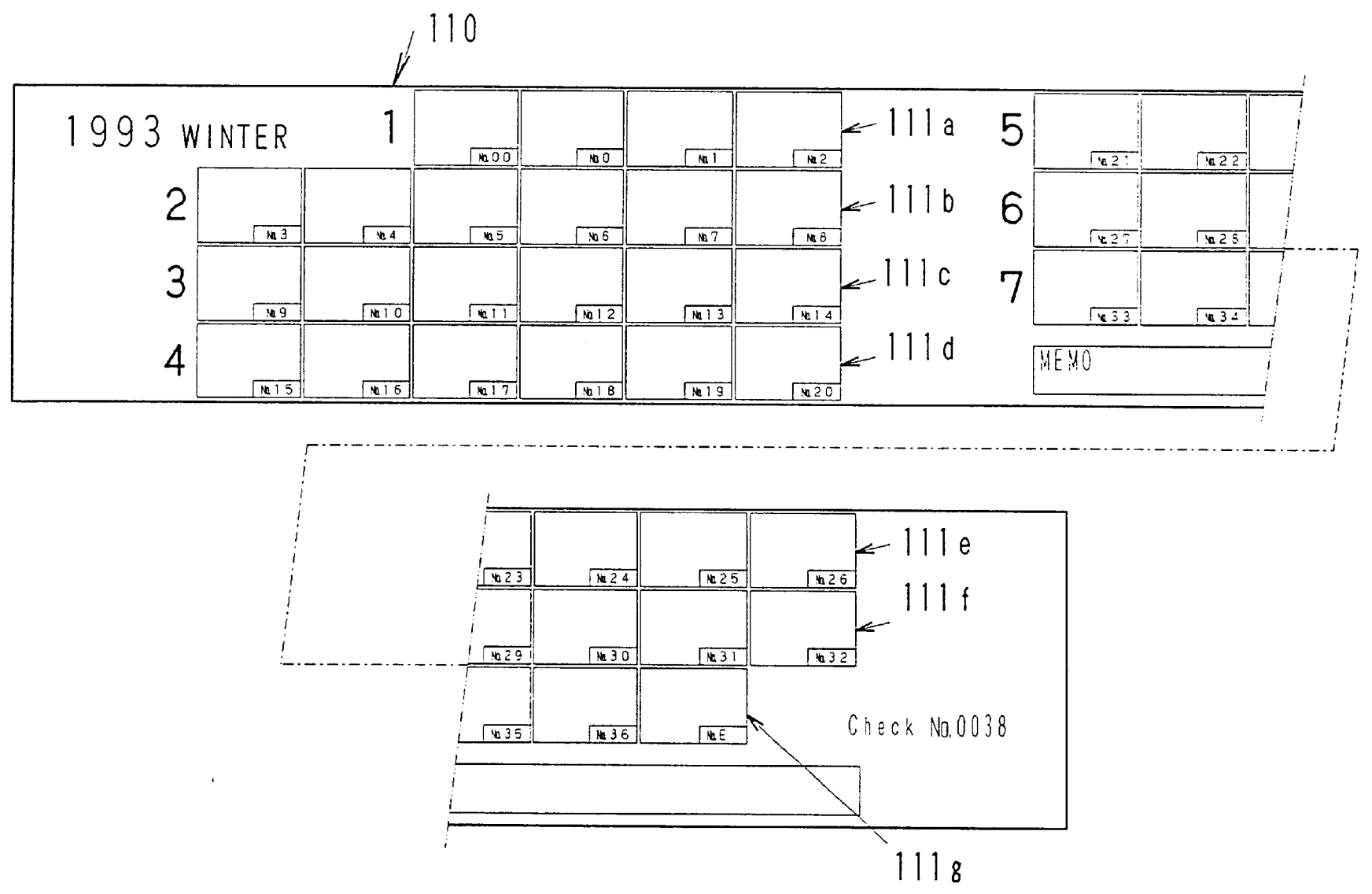

In FIG. 11, the index photograph 110 is produced for the 36-exposure film. At least seven film piece images 111a to 111g are recorded in positive fashion. A factor of reducing the positive images is determined differently from the above embodiment, to record the smaller film piece images 111a to 111g than those of the index photograph 10 for 24 exposures.

In the above, the film piece images 15a to 15e, 101a to 101c, 111a to 111g are arranged in three or four lines. Alternatively it is possible to arrange film piece images in a different number of lines, i.e. two or five lines, in consideration of the standardized lengths of the films for 12, 24 or 36 exposures.

Figure 12:
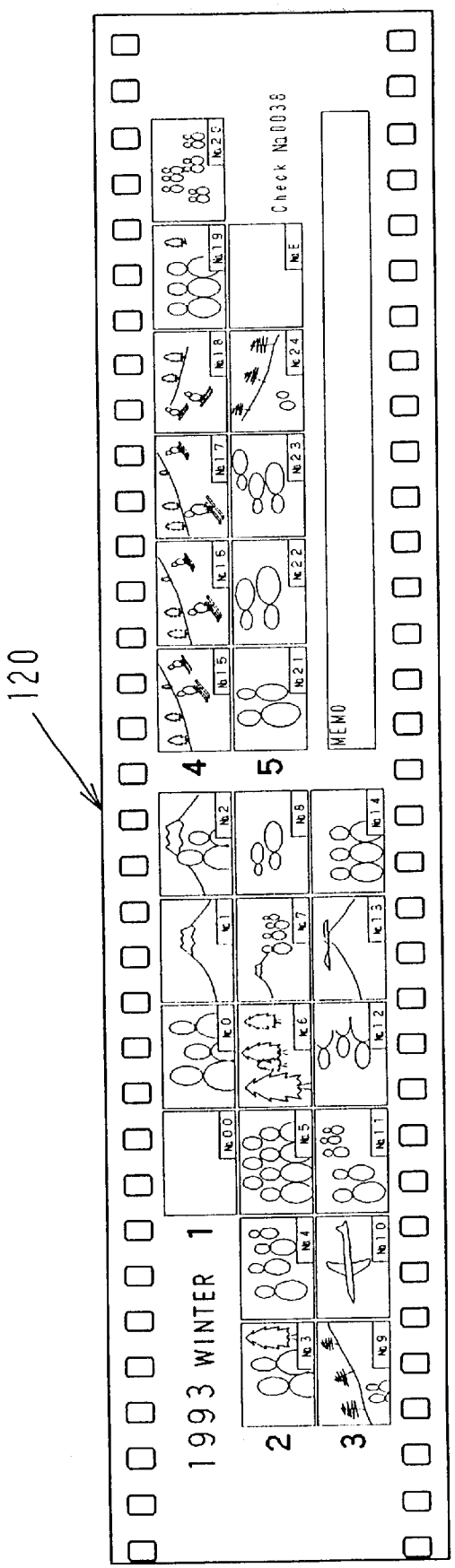
FIG. 12 is a plan view illustrating a preferred embodiment in which an index film piece is used.

In the above, the color paper is used for producing the index photographs. Alternatively it is possible as illustrated in FIG. 12 to use color reversal film, on which frames are recorded at the format the same as the above, to produce an index film piece 120 as index sheet.

Figure 13:
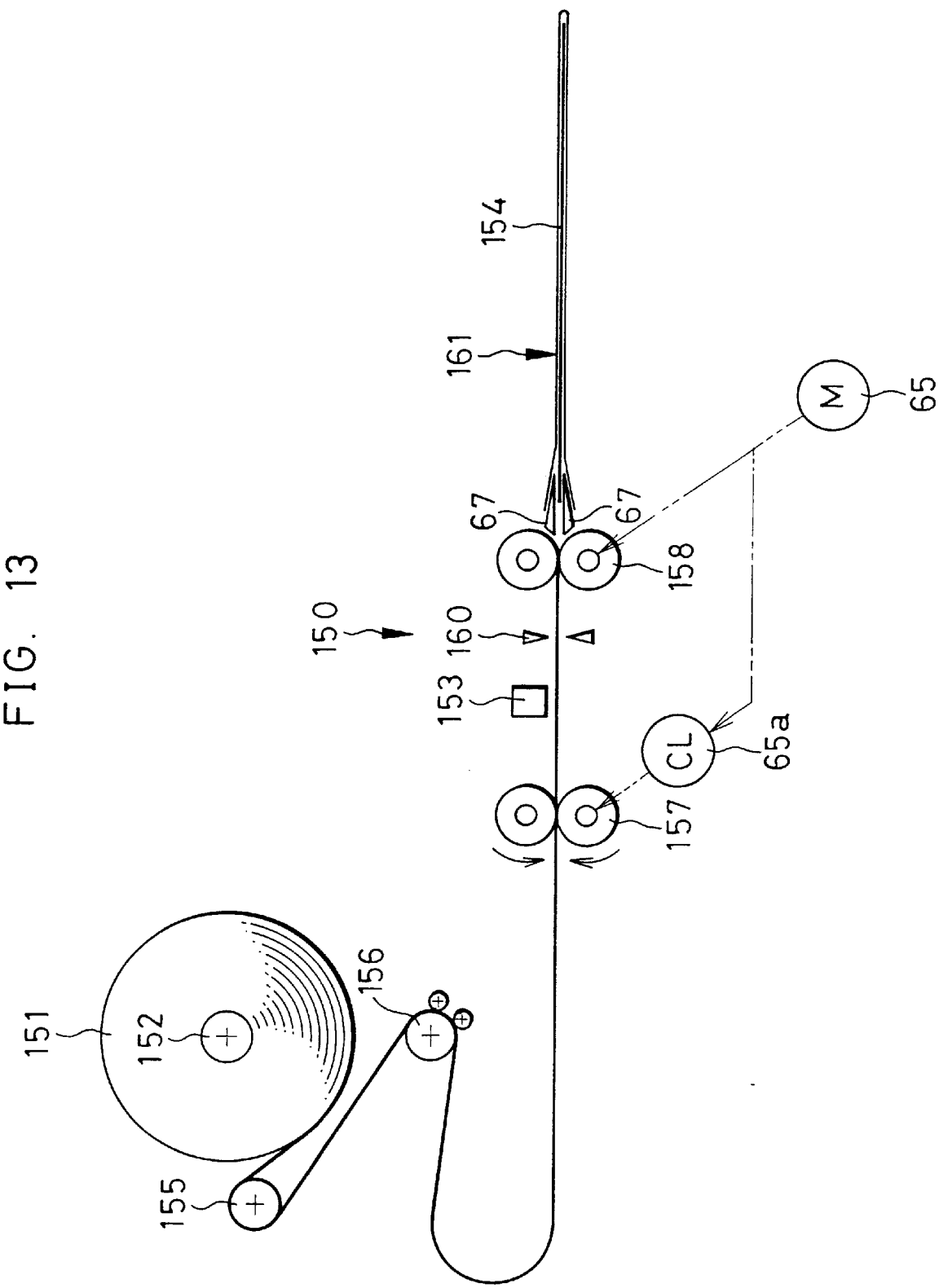
FIG. 13 is a schematic view illustrating an index photograph inserter section in which a continuously formed index photograph is cut and inserted into a film sheath.

In the above embodiments, the index photograph is previously formed at the size equal to the film pieces and inserted into an associated pocket in the film sheath. Alternatively index photographs can be initially produced in a form of continuous sheet, and be separated before insertion into the pockets. In FIG. 13, an index photograph inserter section 150 is associated with a station of inserting an index photograph 154, and incorporated in the cutting inserter 37 in FIG. 8 instead of the index photograph inserter section 61. In general, the index photograph inserter section 150 is structurally similar to the cutting inserter section 37a.

As illustrated in FIG. 13, an elongated index photograph as continuous sheet is wound as a roll 151, and set around a shaft 152. Cutting marks or indicia are formed on the elongated index photograph and associated with respective strips of negative films. The cutting marks are detected by a mark sensor 153, and are used as a border position where the elongated index photograph is cut into index photograph 154. The elongated index photograph is looped by a damper roller 155 and a guide roller 156, and transported by pairs or transport rollers 157 and 158 to a cutting position, where a cutter 160 cuts the elongated index photograph at the size of the film pieces. The index photograph 154 is inserted into a film sheath 161 by the transport rollers 158. Other structures are similar to those of the index photograph inserter section 61 in FIG. 7. Elements similar to those of the former embodiment are designated with identical reference numerals. The index photograph 154 is inserted, while reserving plural empty pockets as many as the film pieces to be inserted. The reserved pockets are used for receiving the film pieces.

In the index photograph inserter section 150, the index photograph 154 is inserted in the station before that for the insertion of film pieces. Alternatively it is possible for an index photograph inserter section to insert the index photograph 154 in a station past that for film pieces. In the above, the index photograph inserter section 150 is integrated with the cutting inserter section 37a for the film pieces. In contrast an index photograph inserter section may be of a type separate from a film cutting inserter for film pieces. The film pieces may be inserted, while reserving one empty pocket between a final film piece from a first film-strip and a first film piece from a second filmstrip. The reserved pocket may be used for receiving the index photograph.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A method of producing an exposed film package, comprising steps of:

cutting respective exposed photographic film into film pieces at a predetermined length, to insert said film pieces into pocket portions in a film sheath material, said film pieces so inserted that one of said pocket portions remains empty beside pocket portions associated with film pieces having been inserted in said film sheath material;

winding said film sheath material as a roll after insertion of said film pieces;

unwinding said film sheath material from said roll, to insert an index sheet into said empty pocket portion in association with said exposed film, said index sheet constituted of photosensitive material on which images from said exposed film are recorded in reduction in size, and arranged in groups associated with said film pieces, said photosensitive material having a size substantially equal to said film pieces; and cutting a film sheath from said film sheath material after insertion of said index sheet, to obtain said exposed film package, said exposed film package including said film pieces constituting said exposed film, said index sheet, and said film sheath containing said film pieces and said index sheet.

2. A method of producing an exposed film package, comprising steps of:

inserting a first index sheet into a pocket portion in a film sheath material, said first index sheet constituted of photosensitive material on which images from exposed photographic film are recorded in reduction in size, said photosensitive material having a size substantially equal to said pocket portion;

inserting a second index sheet into a pocket portion following plural pocket portions in said film sheath material to follow said pocket portion for said first index sheet;

winding said film sheath material as a roll after insertion of at least said first and second index sheets;

unwinding said film sheath material from said roll, to insert film pieces into said plural pocket portions in association with said first or second index sheet, said film pieces cut from said exposed film at a predetermined length, said images on said first or second index sheet being arranged in groups associated with said film pieces; and cutting a film sheath from said film sheath material after insertion of said film pieces, to obtain said exposed film package, said exposed film package including said film pieces constituting said exposed film, said first or second index sheet, and said film sheath containing said film pieces and said first or second index sheet.

* * * * *

UNITED STATES PATENT AND TRADEMARK OFFICE
CERTIFICATE OF CORRECTION

PATENT NO.     : 6,270,935 B1
DATED          : August 7, 2001
INVENTOR(S)    : Setsuji Tatsumi, Kazuhiro Tagawa, Toru Kurokawa, Katsumi Otake, Masashi Horiguchi, Toru Tsuji It is certified that error appears in the above-identified patent and that said Letters Patent is hereby corrected as shown below:

Title page,
Item [30] Foreign Application Priority Data section, the number reading "5-328823" should read -- 5-328828 --.

Signed and Sealed this

Twenty-sixth Day of March, 2002

Attest:

JAMES E. ROGAN
*Attesting Officer*  *Director of the United States Patent and Trademark Office*

UNITED STATES PATENT AND TRADEMARK OFFICE
CERTIFICATE OF CORRECTION

PATENT NO.   : 6,270,935 B2
DATED        : August 7, 2001
INVENTOR(S)  : Setsuji Tatsumi et al.

It is certified that error appears in the above-identified patent and that said Letters Patent is hereby corrected as shown below:

<u>Title page,</u>
Item [30], Foreign Application Priority Data, the number reading "5-328823" should read -- 5-328828 --.

Signed and Sealed this

Twenty-sixth Day of August, 2003

JAMES E. ROGAN
*Director of the United States Patent and Trademark Office*